United States Patent Office 3,799,838
Patented Mar. 26, 1974

3,799,838
CLEANER AND PRIMER COMPOSITION FOR METAL SURFACES
Harvey P. Shaw, Troy, and Robert A. Murphy, Burnt Hills, N.Y., assignors to General Electric Company
No Drawing. Filed July 15, 1971, Ser. No. 163,038
(Filed under Rule 47(a) and 35 U.S.C. 116)
Int. Cl. B32b 15/08, 25/04; C09k 3/00
U.S. Cl. 161—207
14 Claims

ABSTRACT OF THE DISCLOSURE

A primer and cleaner composition for metal surfaces having therein 2.00 to 46.0% by weight of an alkenyl tris(organoxy)silane from 0.01 to 5.0% by weight of phosphorous acid, from 0.1 to 30% by weight of a silicate or a partial hydrolyzate product of a silicate and from 50 to 97% by weight of a ketone.

The preferable ketone in the above composition is methylethyl ketone. The present composition is especially suitable as a cleaner and primer composition for adhering one-package room temperature vulcanizable silicone compositions to metal surfaces.

BACKGROUND OF THE INVENTION

The present invention relates to a cleaner and primer composition and in particular it relates to a cleaner and primer composition for bonding room temperature vulcanizable silicone compositions to metal surfaces.

Primer compositions for adhering a rubber composition and particularly a silicone rubber composition to metal surfaces is well known in the art such as, for instance, U.S. Pat. 3,318,717. However, insofar as is known, prior to the present time such primer compositions have not been used or have functioned as a cleaner of the metal surfaces as well as functioning as an adhesive to bond the rubber or particularly a silicone rubber composition to the metal surface.

Various types of materials are used in construction. Lately, there has appeared the use of silicone rubber compositions in construction for various purposes such as caulking joints, and such other uses. In any case, such silione rubber compositions are applied to metal surfaces. Although such silicone rubber compositions and other rubber compositions adhere to such surfaces and particularly metal surfaces with various amounts of tenacity, it is often felt that it is necessary to form a superior type of bond between the silicone rubber composition and the metal surfaces. To achieve this purpose, it has been the common practice in the industry to use primer compositions which are first applied to the metal surface and thereafter the silicone rubber compositions applied over the primer composition and cured.

Primer compositions for heat cured silicone rubber are well known as evidenced by the above-mentioned patent. However, such primer compositions do not function very efficiently with room temperature vulcanizable silicone rubber which is used in the construction industry. Further, such primer compositions for heat cured rubber did not function as cleaners for the metal substrate and the use of a cleaner and primer composition which would function first as a cleaner and then as a primer composition was not envisioned by the prior art. As such the practice common in the industry and in particular the constrution industry was to first clean the metal surface and then apply the appropriate primer composition onto the metal surface and thereafter there was applied over the primer composition the silicone rubber composition. As mentioned previously, primer compositions for heat cured silicone rubber were found not to function very well or efficiently for room temperature vulcanizable silicone rubber. Further, since room temperature vulcanizable silicone rubber is most often used in construction applications and particularly the construction of buildings, it was desired to develop a primer composition which not only would function very efficiently for bonding room temperature vulcanizable silicone rubber to metal substrates but further to have such a composition which would also clean the metal surface from grime, soot and other deposits.

Accordingly, it is one object of the present invention to provide a composition which functions first as a cleaner and secondly as a primer composition for bonding silicone rubber to metal surfaces.

It is another object of the present invention to provide a cleaner and primer composition for bonding room temperature vulcanizable silicone rubber to metal substrates.

It is yet another object of the present invention to provide a cleaner and primer composition for bonding one-package room temperature vulcanizable silicone rubber compositions to metal substrates.

It is still an additional object of the present invention to provide a cleaner and primer composition which is very efficient and inexpenisve for bonding room temperature vulcanizable silicone rubber compositions to metal substrates.

These and other objects of the present invention are accomplished by means of the invention discussed below.

SUMMARY OF THE INVENTION

In accordance with the above objects, there is provided a primer and cleaner composition for metal surfaces comprising (a) 2.00–46% by weight of an alkenyl tris-organosilane of the formula, (1) 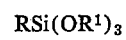 $RSi(OR^1)_3$ (b) from 0.01 to 5.0% by weight of a phosphorous acid, (c) from 0.1 to 30% by weight of a silicate selected from the class of silicates of the formula, (2) 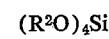 $(R^2O)_4Si$ and partial hydrolyzate products of the above silicates and from 50 to 97% by weight of a ketone of the formula, (3) 
$$R^3 \overset{\overset{\displaystyle O}{\|}}{C} R^4$$

where R is an alkenyl radical of 2 to 8 carbon atoms, $R^1$ is selected from the group consisting of monovalent hydrocarbon radicals and halogenated monovalent hydrocarbon radicals, $R^2$ is selected from monovalent hydrocarbon radicals and hydroxyalkyl radicals of up to 8 carbon atoms, $R^3$ and $R^4$ are independently selected from monovalent hydrocarbon radicals and halogenated monovalent hydrocarbon radicals of up to 10 carbon atoms.

Preferably, the alkenyl tris-organoxysilane is vinyl-tris-2-methoxyethoxysilane and the alkyl silicate is ethyl-ortho-silicate. Furthermore, the preferable ketone is methylethyl ketone.

The above primer composition is especially suitable for use with room temperature vulcanizable silicone rubber compositions, and particularly one-package room temperature vulcanizable silicone rubber compositions. As an example, one such room temperature vulcanizable silicone rubber composition may comprise a silanol-terminated dimethylpolysiloxane, a filler and an aminoxy silicone material having a diaminoxy organosilicon material and a polyaminoxy organosilicon material mixture.

The above bonding composition is especially suited to bonding room temperature vulcanizable silicone rubber compositions to metal substrates of aluminum, stainless steel, lead and copper.

DETAILED DESCRIPTION OF THE PREFERRED EMBODIMENT

Illustrative of the radicals represented by R in Formula 1 are vinyl, allyl, cyclohexenyl, etc. radicals. The radical R is preferably an alkenyl radical of no more than 8 carbon atoms. More preferably, the R radical is a vinyl radical.

Illustrative of the monovalent hydrocarbon radicals and substituted monovalent hydrocarbon radicals represented by $R^1$ of Formula 1 are, for example, alkyl radicals, e.g., methyl, ethyl, propyl, butyl, octyl, etc. radicals; aryl radicals, e.g., phenyl, naphthyl, tolyl, xylyl, etc. radicals; aralkyl radicals e.g., benzyl, phenylethyl, etc. radicals; alkenyl radicals, e.g., vinyl, allyl, cyclohexenyl, etc. radicals; cycloalkyl radicals, for example, cyclohexyl, cycloheptyl, etc. radicals; halogen-substituted monovalent hydrocarbon radicals, such as, for example, chloromethyl, chloroethyl, dibromophenyl, etc. radicals; as well as hydrocarbonoxy-substituted hydrocarbon radicals having the formula —$R^7OR^8$, where $R^7$ is a divalent alkenyl radical or divalent arylene radical, such as methylene, ethylene, p-phenylene, etc. radicals, and $R^8$ is a monovalent hydrocarbon radical of a type previously described for $R^1$.

The compound coming within the scope of Formula 1 and which is most often used in the present invention is vinyl-tris-2-methoxyethoxysilane. Other compounds which are preferred in the present invention coming within the scope of Formula 1 are, for example, vinyltriethoxysilane, vinyltrimethoxysilane, vinyltriphenoxysilane, vinyl-tris-phenoxyphenylsilane, vinyl-tris-methoxysilane, vinyl-tris-phenoxymethoxysilane, as well as all the analogs of the compounds mentioned above wherein the vinyl group is replaced by either an allyl radical or some other alkenyl radicals, such as a cyclohexenyl radical. In particular, such compounds coming within the above definition are allyltriethoxysilane and cyclohexenyltriethoxysilane.

As set forth in the above definition of the invention, there is used in the present primer composition from 0.1 to 5.0% by weight of phosphorous acid. It should be mentioned that only phosphorous acid can be used in the present invention. Other acids, such as maleamic acid, hydrochloric acid or acetic acid do not provide a sufficient degree of bonding or do not result in primer compositions which impart a sufficient degree of bonding between the silicone rubber composition and the metal substrate. When other acids, such as sulfuric acid, are used in the present primer composition, there resutls a reaction between the components in the primer composition so as to provide a composition unsuitable for bonding silicone rubber compositions to metal substrates.

In addition, as a necessary ingredient as indicated above, there must be in the present composition an alkenyl-tris-organoxysilane of Formula 1. One of the radicals attached to the silicon must be an unsaturated hydrocarbon radical. If all the radicals are saturated, then the resulting primer composition does not form a bond of a sufficient strength between the silicone rubber composition and the metal substrate.

In accordance with the above disclosure, there must also be encompassed therein a silicate of Formula 2 or the partial hydrolyzate product of the silicate of Formula 2. Such silicates, particularly alkyl orthosilicates and hydroxyalkyl orthosilicates of Formula 2, are well known in the art. The radical $R^2$ in Formula 2, as indicated, is selected from monovalent hydrocarbon radicals, and particularly alkyl radicals and further from hydroxyalkyl radicals of up to 8 carbon atoms. Thus, $R^2$ in Formula 2 may be an alkyl radical, an aryl radical, an aralkyl radical, an alkenyl radical, a cycloalkyl radical, and further even a halogenated-substituted monovalent hydrocarbon radical such as a haloalkyl radical of up to 8 carbon atoms. However, more preferably, $R^2$ is a lower alkyl radical or hydroxyalkyl radical of up to 8 carbon atoms and, preferably, up to 4 carbon atoms. Thus, the preferred radicals for $R^2$ in Formula 2 are, for example, methyl, ethyl, propyl, butyl, octyl, etc. radicals; hydroxymethyl, hydroxyethyl, hydroxybutyl, etc. radicals. One of the preferred alkyl orthosilicates within the scope of Formula 2 which is well known in the art is ethyl orthosilicate. The partial hydrolyzates of the alkyl orthosilicates within the scope of Formula 2 are also well known in the art and many of these materials are commercially available, such as, for example, the materials sold under the name "Ethyl Silicate-40" by Union Carbide Corporation, which is a mixture of ethylpolysilicates having about 40% available silica and which is derived from the controlled hydrolysis of tetraethylsilicate.

Besides the above components in the primer composition, there is utilized a ketone within the scope of Formula 3. $R^3$ and $R^4$ are independently selected from monovalent hydrocarbon radicals and halogenated monovalent hydrocarbon radicals of up to 10 carbon atoms. In particular, $R^3$ and $R^4$ are monovalent saturated aliphatic radicals, such as alkyl radicals, cycloalkyl radicals, haloalkyl radicals and cyanoalkyl radicals of up to 10 carbon atoms. Preferably, $R^3$ and $R^4$ are alkyl radicals of from 1 to 10 carbon atoms.

Since the primer composition must be fast drying if it is to be used in construction applications, it is necessary that the ketone component have a low boiling point. Preferably, the boiling point of a ketone within the scope of Formula 3 is below 250° C. The lowest boiling ketone within the scope of Formula 3 and which is one of the preferred ketones as defined in the present case is acetone. Other ketones which are preferred in the present invention are methylbutyl ketone, secondary butylmethyl ketone, dibutyl ketone, diethyl ketone, ethylbutyl ketone, methylethyl ketone, ethylpropyl ketone, methylisobutyl ketone, diisobutyl ketone, dipropyl ketone, isopropylethyl ketone, methylpropyl ketone, methylamyl ketone, methylisoamyl ketone, methylisopropyl ketone, diisopropyl ketone, diphenyl ketone, ethylisobutyl ketone, and ethylisobutyl ketone. Of these ketones, the more preferable ketones, because of their cleaning action, are methylethyl ketone, acetone, diethyl ketone, methylisobutyl ketone, methylpropyl ketone and methylisopropyl ketone. In addition, these ketones are preferred in the present primer composition in that they have low boiling points and thus permit the primer composition to dry at a rate which is desired in construction applications. These ketones that are used in the present composition are the most important part of the primer composition. Although in one aspect they function as solvents for the other components of the primer composition, they have, in addition, some other properties which result in an efficient, cleaner primer composition. In one aspect, the present primer compositions, with one of the ketones coming within the scope of Formula 3, are very efficient in cleaning metal surfaces from grime, soot and other deposits.

In application, the primer composition is applied to the metal surface, brushed or sprayed thereon, and then the metal surface is lightly wiped with a cloth, brush or roller. As a result, the soot, grime and other deposits are wiped away while at the same time leaving a deposit of the primer composition on the metal surface. Thus, one of the most important aspects of the primer composition of the present invention is that it is a cleaner. Such a cleaning action is not obtained by the other normal solvents which are described in the literature or have been used in primer compositions to the present time.

The other important function of the ketone component of the present primer composition is that the ketone in some way enhances the bonding effect of the resulting composition. Thus, although in the cleaning mechanism some of the primer composition is wiped away, nevertheless, the amount that is still left forms a better bond with room temperature vulcanizable silicone rubber compositions, and particularly one-package room temperature vulcanizable silicone rubber compositions, than is obtained with primer compositions presently in use. In some way, the ketone coming within the scope of Formula 3 acts to enhance the bonding activity of the alkenyl tris-organoxy silane of Formula 1, the phosphorous acid and the silicate of Formula 2 so that a superior bond results between a metal substrate and a room temperature vulcanizable silicone rubber composition.

Thus, in addition to being a solvent for the other components in the primer composition, the ketone within the scope of Formula 3 acts with the other components to provide a superior bond and further functions as a cleaner, removing deposits from the metal substrate. The primer composition of the present case is particularly suited for bonding silicone rubber compositions to all types of metal substrates. The preferred metal substrates which are commonly present in the construction industry and to which the present invention is directed are lead, copper, aluminum, duranotic aluminum, carbon steel, stainless steel and other such metal substrates.

In the present primer composition, there is preferably from 2.00 to 46% by weight of the alkenyl tris-organoxy silane of Formula 1, from 0.01 to 5.0% by weight of phosphorous acid, from 0.1 to 30% by weight of a silicate of Formula 2, and partial hydrolyzate products of the above silicate of Formula 2, and from 50 to 97% by weight of the ketone of Formula 3. It should be noted that all these components are in the above-percentages necessary in the primer composition of the present case.

There cannot be less than 2.0% of the alkenyl tris-organoxy silane in a mixture of the four components, since a good bonding primer composition will not be formed. If there is more than 46% by weight of the alkenyl tris-organoxy silane then it is found that the excess amount of about 46% is not necesary. Even though there may be as little as 0.01% by weight of phosphorous acid, no purpose was found by exceeding the concentration of phosphorous acid by more than 5.0%.

In the present composition, it is preferable to employ at least some silicate of that of Formula 2 or hydrolyzate product of the silicate of Formula 2. Thus, it is preferable that the silicate which interreacts in some way with the alkenyl tris-organoxysilane, be present in a concentration of 0.1 to 30% by weight in terms of the way of the mixture of the four components. It should be mentioned that in some applications the silicate of Formula 2 is not a necessary part of the primer composition. However, it is preferable to use within the ranges indicated above some amount of the silicate of Formula 2 in the composition when the primer composition is to be used to bond one-package room temperature vulcanizable silicone rubber to metal substrates.

With respect to the four components of the primer composition, it is preferable that there be 50 to 97% by weight of the mixture of a ketone of the formula of that of Formula 3 or a mixture of such ketones. as can be envisioned, it is understood that at least 50% of the composition must comprise the ketone, since the ketone has the dual function of a cleaner as well as the co-bonding agent in the composition. Preferably, in the present composition there is 3.0 to 6.0% by weight of the alkenyl tris-organoxy silane of Formula 1, 0.05 to 1% of the phosphorous acid, 0.5 to 3% by weight of the silicate of formula 2 or the hydrolyzate product of such silicate of Formula 2, and 90.0 to 96.5% by weight of the ketone of Formula 3. The preferred concentrations for the various ingredients of the primer composition was found to be especially desirable for bonding one-package room temperature vulcanizable silicone rubber to the metal substrates normally found in the construction industry.

One type of one-package room temperature vulcanizable silicone rubber composition with which the present cleaner and primer composition is preferably used is that found and described in U.S. Pat. 3,296,161 and U.S. Pat. 3,382,205, whose disclosure is hereby incorporated by reference into the present case.

Such a one-package room temperature vulcanizable silicone rubber composition is formed from a mixture of a silanol-terminated dimethylpolysiloxane, a filler and a silane of the formula, (4) 

with a carboxylic acid salt of a metal ranging from lead to manganese inclusive, in the electromotive series of metals, where $R^5$ is selected from monovalent hydrocarbon radicals, halogenated monovalent hydrocarbon radicals, and X is a saturated aliphatic acyl radical of a carboxylic acid. The above bonding composition may also include a dialkoxydiacyloxysilane of the formula, (5) 

where $R^6$ is a lower alkyl radical of 1 to 8 carbon atoms and X is as defined previously. Such a dialkoxydiacyloxysilane of Formula 5 is disclosed in the above U.S. Pat. 3,296,161, whose disclosure has been incorporated into this application by reference.

The preferred one-package room temperature vulcanizable silicone rubber composition for use in the present case may contain therein a silanol-terminated dimethylpolysiloxane, a treated fumed silica and a silanol fluid commonly used in such compositions as a processing agent and also as a viscosity control agent. In such a composition there may also be found methyltriacetoxysilane, di-t-butoxydiacetoxysilane, and dibutyl tin dilaurate.

A composition encompassing these six ingredients is commonly used in the construction for caulking joints, windows, and particularly between metal surfaces for which the primer composition of the present case is desired.

The silanol fluid mentioned above may be a silanol fluid containing $(CH_3)_3SiO_{1/2}$, $(CH_3)_2SiO$ units and $CH_3SiO_{3/2}$ units, which units are present in the desired proportions and which silanol fluid has therein about 0.5% by weight hydroxyl groups. For more detail with respect to this type of one-package room temperature vulcanizable silicone rubber composition, one is referred to the above patents.

Another type of one-package room temperature vulcanizable silicone rubber composition often used in the construction industry is that disclosed in U.S. Pat. 3,528,941 and U.S. Pat. 3,341,486. As disclosed in these patents, such aminoxy room temperature vulcanizable silicone rubber composition may contain a silanol terminated dimethylpolysiloxane, a filler such as calcium carbonate, and an aminoxy silicone material having (1) a diaminoxy organosilicon material having attached to silicon, two aminoxy radicals of the formula —OY, and (2) from 0.1 to 50% by weight of a polyaminoxy organosilicon material having attached to silicon at least 3 of said aminoxy radicals where Y is a monovalent amine radical selected from the class consisting of $—NR_2^7$ and a heterocyclic amine radical attached to silicon by silicon oxygen/nitrogen linkages and $R^7$ is a monovalent hydrocarbon radical.

A different type of room temperature vulcanizable silicone rubber composition containing aminoxy groups therein is identified in U.S. Pat. 3,528,941, which states the composition may contain a silanol-terminated polydiorganosiloxane and an alkoxy cyclopolysiloxane which may be selected from an aminoxy cyclopolysiloxane and/or a mixture consisting essentially of an alkoxy cyclopolysiloxane where, in addition to the alkoxy cyclopolysiloxane, there may be used a small amount of a Group IVa metal complex. Such a one-package room temperature vulcanizable silicone rubber composition may comprise a mixture of a silanol-terminated polydimethylsiloxane having a viscosity of about 90,000 centiposes at 25° C., 10 parts of a hydrogenated castor oil thickener, 2 parts of fumed silica filler and 5 parts of an aminoxy cyclotetrasiloxane of the formula,

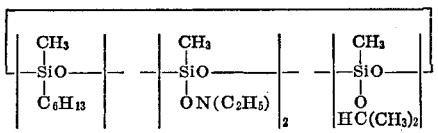

For further information as to such aminoxy room temperature vulcanizable silicone rubber compositions, one is referred to U.S. Pat. 3,528,941, which disclosure is hereby incorporated into this application by reference.

Another type of aminoxy room temperature vulcanizable silicone rubber composition comprises 100 parts of a silanol-terminated polydimethylsiloxane having a viscosity of 3,000 centipoises at 25° C. mixed with 4 parts of a mixture consisting of a diaminoxysilicone material composed of two units of the formula,

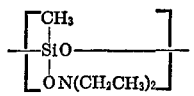

chemically combined with two units of the formula,

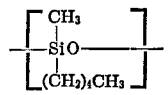

and a triaminoxy silicone material of the formula,

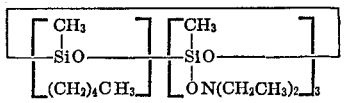

utilizing 99 parts of diaminoxy silicone material per part of triaminoxy silicone material. This composition, upon being exposed to the atmosphere, will cure at room temperature to a silicone rubber composition. For further information as to this composition, one is referred to U.S. Pat. 3,341,486, whose disclosure is hereby incorporated by reference into the present application.

As discussed, the present cleaner/primer composition is preferably used with the one-package room temperature vulcanizable silicone rubber compositions discussed above. However, the present composition is also useful with other types of one-package room temperature vulcanizable silicone rubber compositions, as well as two-package room temperature vulcanizable silicone rubber compositions as that disclosed in Berridge U.S. Pat. 2,834,555, whose disclosure is hereby incorporated as a reference into this application.

The primer composition within the scope of the present invention comprises as essential ingredients, the silane of Formula 1, the phosphorous acid and the ketone of Formula 3, with the preferable addition of the silicate of Formula 2. This composition is prepared by mixing the desired ingredients at room temperature. After mixing, the composition of the present invention is ready for use. The cleaner and primer composition is stable for many months in closed containers after which time they have been found to be still as efficient as desired. In applying the cleaner/primer composition of the present invention to a metal surface to be primed, any of the conventional techniques may be employed. Thus, the cleaner and primer composition of the present case may be applied to the surface by dipping, painting, spraying and the like. In general, the cleaner and primer compositions are applied to the surface and then after one or two minutes the surface is lightly wiped with a cloth, brush, roller or what have you. After this wiping application, the thickness of the film is generally of the order of a few microns or perhaps up to a tenth of a mil. However, the thickness of the film in the present case is not critical since even a film of very small thickness performs very efficiently as a bonding agent. The film is allowed to dry on the cold metal surface simply by the action of air currents, i.e., causing the evaporation of the ketone. As such, after a few minutes, depending upon the temperature, the film has dried to a hard, solid state. Although heating elements can be applied in proximity to the film to evaporate the solvent, this is not necessary. After the cleaner and primer composition of the present case has dried, then the silicone rubber composition is applied and allowed to cure as is normal in the practice of the art and particularly is normal in one-package room temperature vulcanizable silicone rubber composition sealants.

Alternatively, after the cleaner and bonding composition of the present case has been applied to the metal substrate and after the substrate has been lightly wiped, the one-package room temperature vulcanizable silicone rubber composition can be applied directly over the film without waiting for all of the solvent to evaporate. Even so, it has been found that a strong bond is formed between the cured silicone rubber composition and the metal substrate.

The following examples are given with the intent to illustrate the invention and without any intention to limit the invention in any way or manner. The examples below are given for the purpose of illustrating the scope of the present invention. In the examples below, the primer composition of the present case was applied to a metal substrate and then the coating was lightly wiped with a cloth. To the resulting coated metal substrate surface there was applied a one-package room temperature vulcanizable silicone rubber composition. After the silicone rubber composition was cured, the resulting laminate was put on a Tinius Olsen Tester, Electomatic Model. The tester has a jaw separation of 0.5 inch per minute. The jaws were separated until the bond was ruptured, at which point the bond strength expressed in pounds per square inch was noted and recorded. This machine is available from the Tinius Olsen Testing Machine Company, Willow Grove, Pa.

EXAMPLE 1

In this example, various primer compositions are prepared containing various amounts of vinyl tris-2-methoxyethoxysilane, partially hydrolyzed ethyl orthosilicate, phosphorous acid and various types of ketones within the scope of the present invention. The various primer compositions that are utilized are indicated in Table 1 below.

TABLE I.—VARIOUS PRIMER COMPOSITIONS OF THE PRESENT CASE

| | Parts | | | | | | |
|---|---|---|---|---|---|---|---|
| | 1 | 2 | 3 | 4 | 5 | 6 | 7 |
| Component: | | | | | | | |
| Vinyl tris-2-methoxyethoxysilane | 4.98 | 6.00 | 4.5 | 7.5 | 8.0 | 9.0 | 10.0 |
| Partially hydrolyzed ethyl orthosilicate | 1.25 | 1.5 | 2.00 | 0.5 | 0.5 | 2.0 | 5.0 |
| Phosphorous acid | 0.156 | 0.10 | 0.18 | 0.20 | 0.25 | 0.15 | 0.15 |
| Methylethyl ketone | 93.5 | | | | | | |
| Acetone | | 92.4 | | | | | |
| Diethyl ketone | | | 93.3 | | | | |
| Methylisobutyl ketone | | | | 91.8 | | | |
| Methylpropyl ketone | | | | | 91.25 | | |
| Methylisopropyl ketone | | | | | | 88.85 | |
| Methylbutyl ketone | | | | | | | 84.85 |

These compositions are used to bond one-package room temperature vulcanizable silicone rubber compositions to Alclad aluminum. The one-package room temperature vulcanizable silicone rubber composition comprises a base mixture containing 60 parts of a silanol-terminated dimethylpolysiloxane, 10 parts of fumed silica and 7 parts of a silanol fluid containing $(CH_3)_3SiO_{1/2}$ units, $(CH_3)_2SiO$ units and $(CH_3)SiO_3$ units, with a hydroxyl content of 0.5 weight percent. There is also present in this one-package room temperature vulcanizable silicone rubber composition a curing agent used with the above base mixture which comprises 80 parts methyltriacetoxysilane, 17 parts of di-t-butoxydiacetoxysilane and 3 parts of dibutyl tin dilaurate. Per 100 parts of the base mixture there is added 4 parts of the curing agent mixture, which mixture of the base mixture and the curing agent mixture forms the one-package room temperature vulcanizable silicone rubber composition. Such a silicone rubber composition is often used as a construction sealant.

In the tests, the primer composition set forth in Table I above is applied by brushing onto Alcad aluminum and then the Alclad aluminum is lightly wiped with a cloth. After the wiping procedure, then the one-package room temperature vulcanizable silicone rubber composition is applied over the primer composition on the Alclad aluminum and allowed to cure. After a 24 hour period in which it is determined that a complete cure of the silicone rubber composition has taken place, the various panels are put on the testing machine in accordance with the procedure outlined previously and the amount of force necessary to separate the silicone rubber layer from the Alcald aluminum is determined. In this respect, it is determined whether the failure is cohesive or adhesive. Cohesive failure is when the silicone rubber layer ruptures prior to the rupturing of the bond between the silicone rubber layer and the aluminum panel. Adhesive failure occurs when the bond between the silicone rubber layer and the Alclad aluminum panel ruptures prior to the rupturing of the silicone rubber layer.

Using the above tests for primer composition No. 1 set forth in Table I, the adhesive value is 160 lbs. per square inch with cohesive failure. With primer composition No. 2 in Table I, there is obtained a shear adhesion value of 170 lbs. per square inch with cohesive failure. The shear adhesive values for primer compositions, 3, 4, 5, 6 and 7 of Table 1, are 165 lbs. per square inch, 180 lbs. per square inch, 155 lbs. per square inch, 180 lbs. per square inch and 175 lbs. per square inch, respectively, and in all cases the failure was cohesive.

EXAMPLE 2

A primer composition is prepared containing vinyltriethoxysilane, ortho n-propyl silicate, phosphorous acid and acetone in the proportions shown in Table II below.

TABLE II.—SHEAR ADHESION VALUES

| Component: | Parts | Alclad aluminum | Copper | Carbon steel | Stainless steel |
|---|---|---|---|---|---|
| Vinyltriethoxysilane | 6.00 | 155/c | 270/c | 240/c | 102/c |
| Ortho n-propyl silicate | 1.5 | | | | |
| Phosphorous acid | 0.15 | | | | |
| Acetone | 92.5 | | | | |

This primer composition was used on the various metal substrates listed in Table II, such as Alclad aluminum, copper, carbon steel and stainless steel, and then the one-package room temperature vulcanizable silicone rubber composition of Example 1 was applied to the primed metal substrate. The shear adhesion values are indicated in Table II for the various substrates, as well as the fact that the failure in all cases was cohesive.

Another primer composition is prepared containing 7 parts of vinyltriethoxysilane, 2.0 parts of ortho n-propyl silicate, 0.15 part of phosphorous acid and 91.85 parts of methylethyl ketone. This primer composition is applied to various metal substrates and the one-package room temperature vulcanizable silicone rubber composition of Example 1 is applied to the substrates and cured thereover. The cured laminate is then tested to determine the shear adhesion values of the bond between the silicone rubber composition and the metal substrates. The one-package room temperature vulcanizable silicone rubber composition of Example 1 is also applied to metal substrates which are primed with the primer composition defined in U.S. Pat. 3,318,717. The resulting laminates are also tested to determine the shear adhesion values. The two sets of shear adhesion values, one set for the prime metal surfaces, are shown in Table III below.

TABLE III.—SHEAR ADHESION VALUES FOR PRIMED AND UNPRIMED SURFACES

| | Primed and cleaned, p.s.i. | Primed with composition of U.S. 3,318,717, p.s.i. |
|---|---|---|
| Substrate: | | |
| Copper | 269 | 118 |
| Lead | 176 | 18 |
| Carbon steel | 299 | 218 |
| Duranodic Al | 289 | 231 |

In all of the above cases, when cleaner/primer composition of the present case is applied to the metal substrate the metal substrate is lightly wiped with a cloth before the silicone rubber composition was applied thereover. As can be seen from the results of Table III, the cleaner and primer composition of the present case results in a considerably stronger bond between the silicone rubber layer and the metal substrate than is obtained without such a cleaner and primer composition of the present case.

EXAMPLE 3

There is prepared a cleaner and primer composition in accordance with the present case by mixing 5.5 parts of vinyltributoxysilane, 2.0 parts of partially hydrolyzed orthoethyl silicate, 0.20 part of phosphorous acid and 93.3 parts of methylethyl ketone. The resulting composition is applied to various metal substrates and then wiped lightly with a cloth. One or two minutes after the wiping has been completed, there is applied over the metal substrate an aminoxy curing one-package room temperature vulcanizable silicone rubber composition as defined and explained in the specification above. This silicone rubber composition is formed from 100 parts of a silanol-terminated polydimethylsiloxane having a viscosity of 3,000 centipoises at 25° C., 50 parts of calcium carbonate, 4 parts of a diaminoxy silicone material composed of two units of the formula,

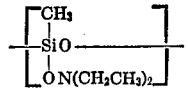

chemically combined with two units of the formula,

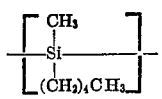

and 0.24 part of the triaminoxy silicone material of the formula,

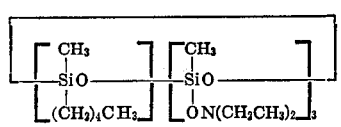

There is also in the composition, one part of dibutyl tin dilaurate.

This aminoxy curing silicone rubber composition is applied to the primed and cleaned metal substrate surfaces and cured for a 12 hour period. The resulting laminate is then tested to determine the shear adhesion values for the various substrates. The above aminoxy curing one-package room temperature vulcanizable silicone rubber composition is also applied to metal substrate panels in which a primer composition of U.S. Pat. 3,318,717 is used. The shear adhesion values for these panels is also determined. The results of the tests are indicated in Table IV below.

TABLE IV.—SHEAR ADHESION VALUES FOR AMINOXY SILICONE COMPOSITION

| | Primed and cleaned | Primed with composition of U.S. 3,318,717 |
|---|---|---|
| Substrate: | | |
| Copper | 114 | 98 |
| Lead | 98 | 80 |
| Stainless steel | 102 | 91 |
| Duranodic Al | 126 | 97 |

As can be seen from Table IV, in the cases where the silicone rubber composition is used with the cleaner and primer composition of the present case, a much stronger bond is effected between the silicone rubber composition and the metal substrate than is the case where a primer composition is not used with the metal substrate.

What is claimed is:

1. A primer and cleaner composition for metal surfaces which is used to clean and enhance the bond formed between metal surfaces and room temperature vulcanizable silicone rubber compositions comprising (a) 2.00%–46% by weight of an alkenyl tris(organoxy) silane of the formula, $$RSi(OR')_3$$

(b) from 0.01% to 5.0% by weight of phosphorus acid, and
(c) from 0.1% to 30% by weight of a silicate selected from the class of silicates of the formula, $$(R^2O)_4Si$$

and partial hydrolyzed products of the above silicates, and
(d) from 50% to 97% by weight of a ketone of the formula, $$R^3\overset{O}{\underset{\|}{C}}R^4$$

where R is an alkenyl radical of 2 to 8 carbon atoms, R' is selected from the group consisting of monovalent hydrocarbon radicals and halogenated monovalent hydrocarbon radicals, $R^2$ is selected from monovalent hydrocarbon radicals and hydroxyalkyl radicals of up to 8 carbon atoms, $R^3$ and $R^4$ are independently selected from monovalent hydrocarbon radicals and halogenated monovalent hydrocarbon radicals of up to 10 carbon atoms.

2. The composition of claim 1 wherein there is present 3.0 to 6.0% by weight of the alkenyl tris(organoxy) silane, 0.05 to 1.0% by weight of the phosphorus acid, 0.5 to 3.0% by weight of the silicate and 90.0–96.5% by weight of the ketone.

3. The composition of claim 1 wherein the alkenyl tris(organoxy) silane is vinyl tris-2-methoxyethoxysilane.

4. The composition of claim 1 wherein the silicate is ethyl silicate.

5. The composition of claim 1 wherein the ketone is selected from the group consisting of methylethyl ketone, acetone, diethyl ketone, methylisobutyl ketone, methylpropyl ketone and methylisopropyl ketone.

6. A silicone rubber, metal substrate composite comprising (a) a metal substrate, (b) cleaning and bonding composition layer having therein 2.00–46.0% by weight of an alkenyl tris(organoxy) silane of the formula, $$RSi(OR')_3$$

from 0.01 to 5.0% by weight of phosphorous acid, from 0.1 to 30.0% by weight of a silicate selected from the class of silicates of the formula, $$(R^2O)_4Si$$

and partial hydrolyzed products of the above silicates, and 50–97% by weight of a ketone of the formula, $$R^3\overset{O}{\underset{\|}{C}}R^4$$

where R is an alkenyl radical of 2 to 8 carbon atoms, R' is selected from the group consisting of monovalent hydrocarbon radicals and halogenated monovalent hydrocarbon radicals, $R^2$ is selected from monovalent hydrocarbon radicals and hydroxyalkyl radicals of up to 8 carbon atoms, $R^3$ and $R^4$ are independently selected from monovalent hydrocarbon radicals and halogenated monovalent hydrocarbon radicals of up to 10 carbon atoms, and (c) a room temperature vulcanizable silicone rubber layer wherein the cleaning and bonding composition bonds the silicone rubber layer to the metal substrate.

7. The composition of claim 6 wherein the cleaning and bonding layer has therein 3.0 to 6.0% by weight of the alkenyl tris(organoxy) silane, 0.05 to 1.0% by weight of the phosphorous acid, 0.5 to 3.0% by weight of the silicate and 90.0–96.5% by weight of ketone.

8. The composition of claim 6 wherein the metal substrate is selected from stainless steel, copper, aluminum and lead.

9. The composition of claim 6 wherein the alkenyl tris(organoxy) silane is vinyl tris-2-methoxyethoxysilane.

10. The composition of claim 6 wherein the silicate is ethyl orthosilicate.

11. The composition of claim 6 wherein the ketone is selected from the group consisting of methylethyl ketone, acetone, diethyl ketone, methylisobutyl ketone, methylpropyl ketone, and methylisopropyl ketone.

12. The laminate of claim 6 wherein the silicone rubber layer is formed from a composition containing (a) a silanol-terminated dimethylpolysiloxane, (b) a filler, and (c) an aminoxy silicone material having (1) a diaminoxy organosilicon material having attached to silicon, two aminoxy radicals of the formula —OY, and (2) from 0.1 to 5.0% by weight of (1) of (c) a polyaminoxy organosilicon material having attached to silicon at least three of said aminoxy radicals, where Y is a monovalent amine radical selected from the class consisting of —NR⁷₂, and a heterocyclic amine radical attached to silicon by a silicon oxygen-nitrogen linkage, and $R^7$ is a monovalent hydrocarbon radical.

13. The laminate of claim 6 wherein the silicone rubber layer is formed from a composition containing (a) a silanol-terminated dimethylpolysiloxane, (b) a filler, (c) a silane of the formula, $$R^5Si(OX)_3$$

and (d) a carboxylic acid salt of metal ranging from lead to manganese, inclusive, in the lectromotive series of metals, where $R^5$ is selected from monovalent hydrocarbon radicals and halogenated monovalent hydrocarbon radicals, X is a saturated aliphatic monoacyl radical of a carboxylic acid.

14. The laminate of claim 13 wherein the silicone rubber layer is formed from a composition having further therein a dialkoxydiacyloxy silane of the formula, $$(R^6O)_2Si(OX)_2$$

where $R^6$ is a lower alkyl radical of 1 to 8 carbon atoms.

References Cited
UNITED STATES PATENTS

| | | | |
|---|---|---|---|
| 3,505,099 | 4/1970 | Neuroth | 161—207 |
| 3,619,256 | 11/1971 | Pepe | 161—207 |
| 2,478,319 | 8/1949 | Raub et al. | 252—170 |
| 2,563,417 | 8/1951 | Pessel | 252—170 |
| 3,318,717 | 5/1967 | Simpson | 106—287 SB |
| 3,542,687 | 11/1970 | Shannon et al. | 106—311 |

OTHER REFERENCES

Crowley et al.: Journal of Paint Technology, vol. 38, No. 496, May 1966, p. 272.

ALLAN LIEBERMAN, Primary Examiner

U.S. Cl. X.R.

106—287 SB, 287 SE; 117—49, 75, 132 BS; 156—329; 161—188, 206